United States Patent
Liu et al.

(10) Patent No.: US 8,300,180 B2
(45) Date of Patent: Oct. 30, 2012

(54) LIQUID CRYSTAL DISPLAY PANEL AND MANUFACTURING METHOD THEREOF

(75) Inventors: Sung-Kao Liu, Hsinchu (TW); Hsiang-Lin Lin, Changhua County (TW); Ching-Huan Lin, Tainan County (TW); Chih-Jen Hu, Taoyuan County (TW)

(73) Assignee: Au Optronics Corporation, Hsinchu (TW)

( * ) Notice: Subject to any disclaimer, the term of this patent is extended or adjusted under 35 U.S.C. 154(b) by 707 days.

(21) Appl. No.: 12/493,253

(22) Filed: Jun. 29, 2009

(65) Prior Publication Data

US 2010/0091230 A1   Apr. 15, 2010

(30) Foreign Application Priority Data

Oct. 9, 2008   (TW) .............................. 97138938 A

(51) Int. Cl.
  *G02F 1/1333*   (2006.01)
  *G02F 1/1337*   (2006.01)
  *G02F 1/1343*   (2006.01)

(52) U.S. Cl. .............................. 349/93; 349/124; 349/39

(58) Field of Classification Search .................. None
  See application file for complete search history.

(56) References Cited

U.S. PATENT DOCUMENTS

| 2004/0114081 A1* | 6/2004 | Sawasaki et al. ............. 349/123 |
| 2007/0103607 A1 | 5/2007 | Hanaoka et al. |
| 2008/0062342 A1* | 3/2008 | Song et al. ..................... 349/38 |

FOREIGN PATENT DOCUMENTS

| CN | 1696774 | 11/2005 |
| CN | 1869779 | 11/2006 |

OTHER PUBLICATIONS

"1st Office Action of China counterpart application", issued on Aug. 7, 2009, p. 1-5.

* cited by examiner

*Primary Examiner* — Wen-Ying P Chen
(74) *Attorney, Agent, or Firm* — Jianq Chyun IP Office

(57) ABSTRACT

A liquid crystal display (LCD) panel and a manufacturing method thereof are provided. The manufacturing method includes providing a panel including a first substrate having scan lines, data lines, an active device electrically connecting the scan and data lines, and a pixel electrode electrically connecting the active device, a second substrate having an opposite electrode, and a liquid crystal (LC) layer disposed between the first and the second substrates and having a monomer material. A first curing voltage and a second curing voltage are applied to the scan and data lines, respectively. The second curing voltage is thus transmitted to the pixel electrode. The first curing voltage is higher than an absolute value of the second curing voltage. The monomer material is polymerized to form a first polymer stabilized alignment (PSA) layer between the LC layer and the first substrate and a second PSA layer between the LC layer and the second substrate. The electrical field is then removed.

21 Claims, 4 Drawing Sheets

LIQUID CRYSTAL DISPLAY PANEL AND MANUFACTURING METHOD THEREOF

CROSS-REFERENCE TO RELATED APPLICATION

This application claims the priority benefit of Taiwan application serial no. 97138938, filed Oct. 9, 2008. The entirety of the above-mentioned patent application is hereby incorporated by reference herein and made a part of specification.

BACKGROUND OF THE INVENTION

1. Field of the Invention

The present invention relates to a liquid crystal display (LCD) panel and a manufacturing method thereof. More particularly, the present invention relates to an LCD panel applying a polymer-stabilized alignment technology and a manufacturing method thereof.

2. Description of Related Art

At the current stage, LCD panel technologies that have been developed to satisfy the requirement of a wide viewing angle include: twisted nematic (TN) LCD panels equipped with wide viewing films, in-plane switching (IPS) LCD panels, fringe field switching LCD panels and multi-domain vertically alignment (MVA) LCD panels. Among these LCD panels, the MVA-LCD panels are widely used in various electronic devices.

In a conventional MVA-LCD panel, an alignment structure is formed, such that liquid crystal (LC) molecules in different areas tilt in different angles and accomplish the wide viewing angle effect. However, the design of the MVA-LCD panel still has the issue regarding unfavorable display contrast. Hence, a polymer-stabilized alignment (PSA) LCD panel aiming at the establishment of a multi-domain alignment through a PSA manufacturing process has been proposed.

The PSA manufacturing process includes first doping reactive monomers into a liquid crystal (LC) layer and applying a specific electrical field thereto. Next, the LC layer is irradiated by a light beam or a thermal source under the electrical field, and thereby the reactive monomers are polymerized and cured, such that a PSA layer is formed on a substrate at respective sides of the LC layer simultaneously. Here, the molecules of the PSA layer are arranged in a certain manner, which is conducive to tilting or arranging the LC molecules in different directions, so as to achieve the wide viewing angle effect.

Besides, in order to enhance the alignment effect of the LC molecules, fine slits are formed on a pixel electrode or alignment protrusions are produced on a substrate in the PSA LCD panel. Nevertheless, the fine slits on the pixel electrode would result in loss of display brightness in the pixel and consequently affect display quality. On the other hand, the disposition of the alignment protrusions causes the LC molecules at peripheries of the alignment protrusions to tilt in discontinuous directions and result in light leakage. Therefore, display contrast of the LCD panel is reduced, and production of extra alignment protrusions results in burdens of the manufacturing process and affects the yield rate thereof.

SUMMARY OF THE INVENTION

The present invention is directed to a manufacturing method of an LCD panel to resolve a conventional issue regarding the structure design of the LCD panel that results in inability to enhance brightness or generation of light leakage.

The present invention is further directed to an LCD panel to resolve an issue regarding loss of brightness of the LCD panel due to disposition of fine slits on a pixel electrode.

The present invention is further directed to a manufacturing method of an LCD panel to complete a polymer-stabilized alignment (PSA) manufacturing process by means of scan lines and data lines providing necessary voltages for polymerization of a monomer material.

The present invention provides a manufacturing method of an LCD panel. The manufacturing method includes following steps. A panel is provided, where the panel includes a first substrate, a second substrate and a liquid crystal (LC) layer. The first substrate has a plurality of scan lines and a plurality of data lines, and the scan lines intersect with the data lines respectively to define a plurality of pixel areas on the first substrate. The first substrate in every pixel area further includes an active device, a pixel electrode, an auxiliary electrode and a shielding electrode, where the active device is coupled to the corresponding scan lines and data lines. The pixel electrode is coupled to the active device. The auxiliary electrode is disposed on the pixel electrode and is coupled to the pixel electrode. The shielding electrode is disposed at peripheries of the pixel electrode and surrounds the auxiliary electrode. The second substrate has an opposite electrode. The LC layer is located between the first substrate and the second substrate, and the LC layer has a plurality of the LC molecules and a monomer material. Next, a first curing voltage is applied to the scan lines and a second curing voltage is applied to the data lines. Here, the first curing voltage is higher than an absolute value of the second curing voltage. At this time, the second curing voltage transmits to the pixel electrode and generates an electrical field in the LC layer to align the LC molecules at a pre-tilt angle. Subsequently, the monomer material in the LC layer is polymerized to form a first PSA layer between the LC layer and the first substrate and to form a second PSA layer between the LC layer and the second substrate. The electrical field is then removed.

In one embodiment of the present invention, the method of polymerizing the monomer material in the LC layer includes a light irradiation of the monomer material. Practically, a power of the light irradiating the monomer material is from 50 mW to 1000 mW, for instance. Moreover, a time of light irradiation of the monomer material is from 50 seconds to 500 seconds.

In one embodiment of the present invention, when the electrical field is applied to the LC layer, a voltage difference between the pixel electrode and the opposite electrode is from 5V to 40V.

In one embodiment of the present invention, a voltage difference between the first curing voltage and the second curing voltage is greater than a threshold voltage of the active device.

In one embodiment of the present invention, a voltage difference between the first curing voltage and the second curing voltage is greater than 7V.

In one embodiment of the present invention, a potential of the opposite electrode and the shielding electrode includes a grounded potential.

The present invention further provides an LCD panel which includes a first substrate, a second substrate, an LC layer, a first PSA layer and a second PSA layer. The first substrate has a plurality of scan lines and a plurality of data lines. The scan lines intersect with the data lines respectively and define a plurality of pixel areas on the first substrate. Besides, the first substrate in every pixel area includes an active device, a pixel electrode, an auxiliary pixel and a shielding electrode, where the active device is coupled to the corresponding scan line and data line. The pixel electrode is coupled to the active device. The auxiliary electrode is disposed on the pixel electrode and is coupled to the pixel electrode. The shielding electrode is disposed at peripheries of the pixel electrode and surrounds the auxiliary electrode. The second substrate has an opposite electrode. The LC layer is disposed between the first substrate and the second substrate, and the LC layer has a plurality of LC molecules. The first PSA layer is disposed between the first substrate and the LC layer. In addition, the second PSA layer is disposed between the second substrate and the LC layer.

In one embodiment of the present invention, the first PSA layer and the second PSA layer are polymerized by a monomer material doped in the LC layer. Practically, the monomer material is a light reactive monomer material, for example. The monomer material is polymerized to form the first PSA layer and the second PSA layer through a light irradiation, where a power of the light irradiating the monomer material is from 50 mW to 1000 mW. Moreover, a time that the light irradiates the monomer material is from 50 seconds to 500 seconds. Before the irradiation, an electrical field is further applied to the LC layer through the opposite electrode and the pixel electrode, such that the LC molecules are arranged at a pre-tilt angle. When applying the electrical field to the LC layer, a voltage difference between the pixel electrode and the opposite electrode is from 5V to 40V. Besides, when applying the electrical field to the LC molecules, a voltage applied to the scan lines is higher than an absolute value of a voltage applied to the data lines. In addition, a voltage difference between the scan lines and the data lines is greater than a threshold voltage of the active device. When applying the electrical field to the LC molecules, a voltage difference between the scan lines and the data lines is greater than 7V, for instance.

In one embodiment of the present invention, the above-mentioned first substrate further includes a plurality of color filter units respectively disposed in the pixel areas.

In one embodiment of the present invention, the second substrate further includes a plurality of color filter units respectively corresponding to the pixel areas.

The present invention provides another manufacturing method of an LCD panel. The method includes following steps. A panel is provided. The panel includes a first substrate, a second substrate and an LC layer. Here, the first substrate has a scan line and a data line. The scan line intersects with the data line respectively. The first substrate also includes an active device and a pixel electrode, where the active device is coupled to the scan line and the data line, and the pixel electrode is coupled to the active device. The second substrate has an opposite electrode. The LC layer is located between the first substrate and the second substrate, and the LC layer has a plurality of LC molecules and a monomer material. Then, a first curing voltage is applied to the scan line, and a second curing voltage is applied to the data line. Here, the first curing voltage is higher than an absolute value of the second curing voltage. The second curing voltage flows into the pixel electrode and generates an electrical field in the LC layer to align the LC molecules at a pre-tilt angle. Subsequently, the monomer material in the LC layer is polymerized to form a first PSA layer between the first substrate and the LC layer and to form a second PSA layer between the second substrate and the LC layer. The electrical field is then removed.

The present invention applies the PSA technology in the LCD panel having the design of the auxiliary electrode and the shielding electrode. Therefore, the LCD panel of the present invention utilizes the PSA layer to provide an appropriate anchor force in cooperation with the structural design of the auxiliary electrode, so as to render the LC molecules in a multi-domain arrangement. In other words, the LCD panel of the present invention does not require disposition of the fine slits in the pixel electrode or disposition of the alignment protrusions on the substrate, which conduces in the enhancement of the display brightness of the LCD panel and increases light transmittance.

To make the above and other features and advantages of the present invention more comprehensible, several embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
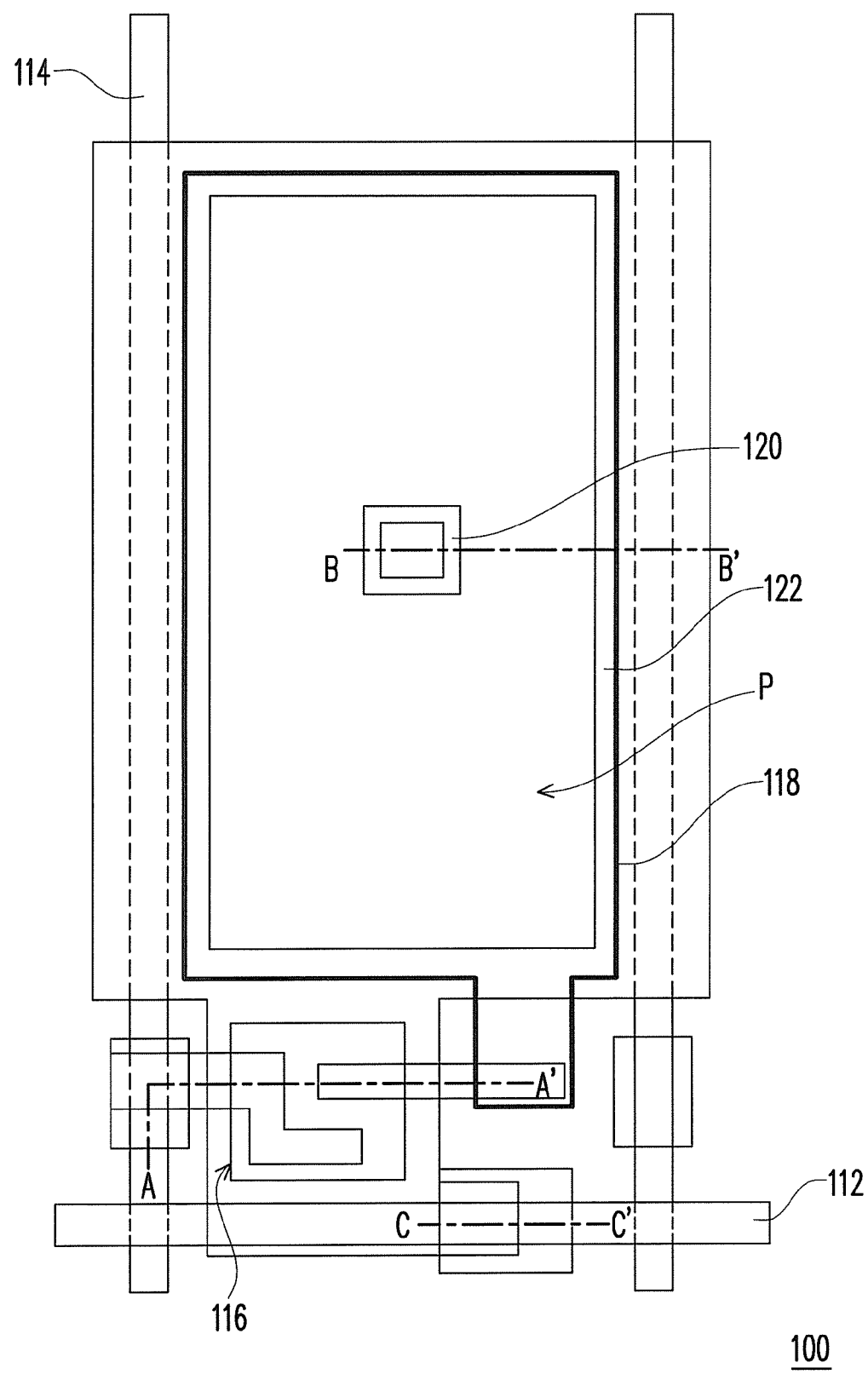
FIG. 1 is a schematic top view of an LCD panel of one embodiment of the present invention.
Figure 2A:
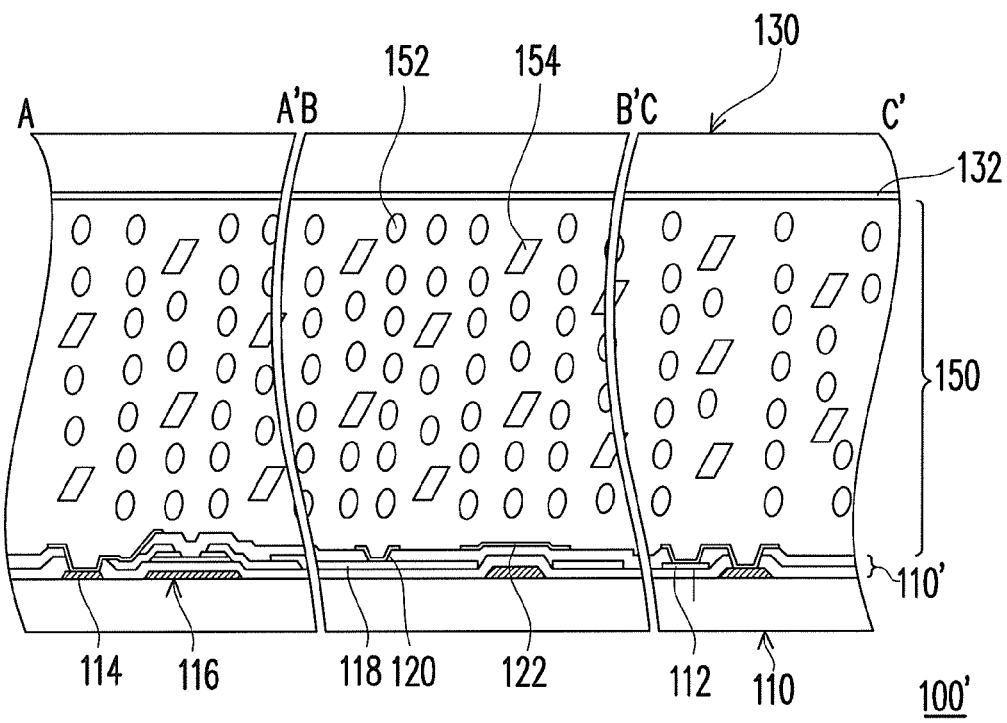
FIGS. 2A and 2B show a manufacturing method of the LCD panel taken along cross-sectional lines A-A', B-B', and C-C' in FIG. 1.
Figure 2B:
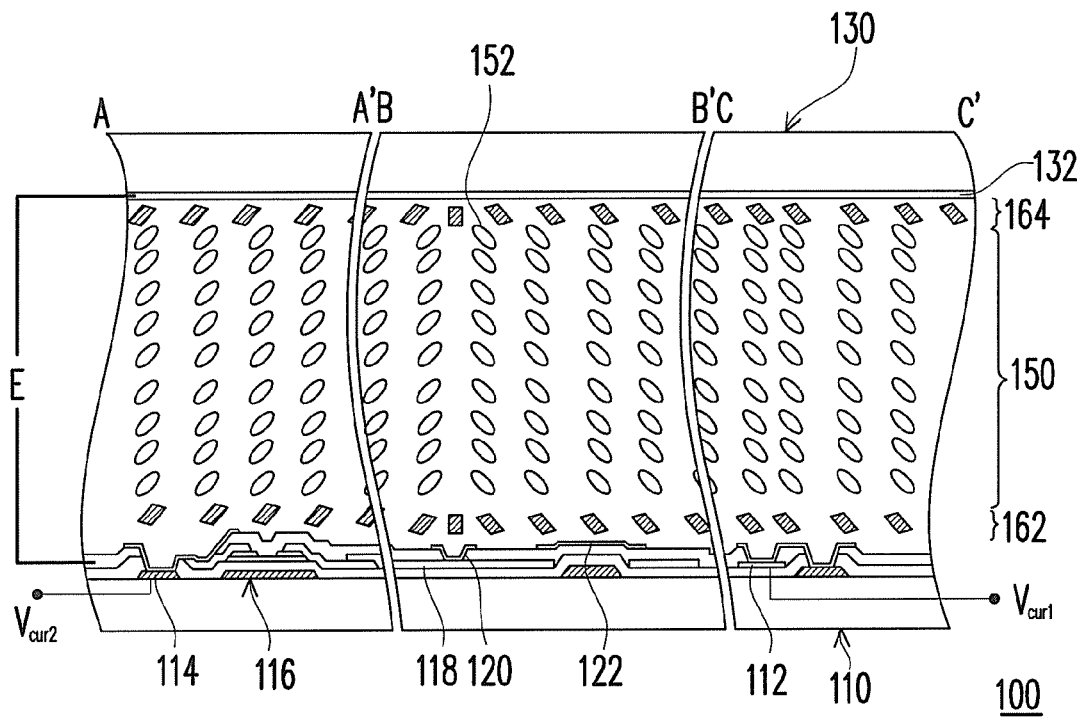

FIG. 1 is a schematic top view of a liquid crystal display (LCD) panel in an embodiment of the present invention. FIGS. 2A and 2B show a manufacturing method of the LCD panel taken along cross-sectional lines A-A', B-B', and C-C' in FIG. 1. Referring to FIG. 1 and FIG. 2A, the manufacturing method of an LCD panel 100 in the present invention includes providing a panel 100' at first. The panel 100' includes a first substrate 110, a second substrate 130, and a liquid crystal (LC) layer 150. The first substrate 110 has an active device array 110'. The second substrate 130 has an opposite electrode 132. The LC layer 150 is disposed between the first substrate 110 and the second substrate 130, and the LC layer 150 has a plurality of liquid crystal (LC) molecules 152 and a monomer material 154 that is able to be polymerized.

More specifically, the first substrate 110 includes a plurality of scan lines 112 and a plurality of data lines 114. In FIG. 1, only one scan line 112 and two data lines 114 are shown to provide a clear indication of each element. The scan lines 112 intersect with the data lines 114, respectively, so as to define a plurality of pixel areas P arranged in matrix on the first substrate 110. The first substrate 110 in each of the pixel areas further includes an active device 116, a pixel electrode 118, an auxiliary electrode 120, and a shielding electrode 122. The active device 116 is coupled to the corresponding scan line 112 and the corresponding data line 114, and the pixel electrode 118 is coupled to the active device 116. The auxiliary electrode 120 is disposed on the pixel electrode 118 and is coupled to the pixel electrode 118. The shielding electrode 122 is located at peripheries of the pixel electrode 118 and is surrounding the auxiliary electrode 120. Notably, the shielding electrode 122 can be used as a capacitor electrode in the LCD panel 100. The shielding electrode 122 and the pixel electrode 118 form a storage capacitor to maintain a display voltage of the pixel electrode 118.

Then, referring to both FIG. 1 and FIG. 2B, a first curing voltage Vcur1, i.e., a scan line curing voltage, is applied to the scan lines 112, and a second curing voltage Vcur2, i.e., a data line curing voltage, is applied to the data lines 114. Moreover, an opposite potential of the opposite electrode 132 and the shielding electrode 122 includes a grounded potential or a fixed potential. Under such circumstances, the second curing voltage Vcur2 transmits to the pixel electrode 118, and an electrical field E is generated in the LC layer 150. The LC molecules 152 are then aligned at a pre-tilt angle.

In the present embodiment, the first curing voltage Vur1 is substantially higher than an absolute value of the second curing voltage Vcur2. Specifically, when the electrical field E is applied to the LC layer 150, a voltage difference between the pixel electrode 118 and the opposite electrode 132 is from 5V to 40V. Besides, in the manufacturing method, a voltage difference between the first curing voltage Vcur1 and the second curing voltage Vcur2 is greater than a threshold voltage of the active device 116, for instance. Practically, the voltage difference between the first curing voltage Vcur1 and the second curing voltage Vcur2 is greater than 7V, for instance, which allows the second curing voltage Vcur2 to be transmitted to the pixel electrode 118 successfully.

In detail, referring to FIGS. 2A and 2B, the method of polymerizing the monomer material 154 in the LC layer 150 includes irradiating the monomer material 154 by using an ultraviolet (UV) light, for example. A power of the UV light irradiating the monomer material 154 is from 50 mW to 100 mW, for instance. Furthermore, a time that the UV light irradiating the monomer material 154 can be from 50 seconds to 500 seconds. Practically, in the steps of irradiation of the monomer material 154, the power and the time of irradiation of the monomer material 154 can be complemented by modification, so as to satisfy different manufacturing requirements. The present invention is not limited to the power and the time of irradiating the monomer material 154 mentioned above. Additionally, the present embodiment is elaborated by taking a light reactive monomer material 154 as an example. When the monomer material 154 is a thermal reactive monomer material or any other material, alternative methods should be utilized for the polymerization of the monomer material 154.

The manufacturing method of the present embodiment utilizes the irradiating method for polymerizing the monomer material 154 in the LC layer 150, so as to form a polymer layer on inner surfaces of the first substrate 110 and the second substrate 130. Consequently, a first polymer stabilized alignment (PSA) layer 162 is formed between the first substrate 110 and the LC layer 150, and a second PSA layer 164 is formed between the second substrate 130 and the LC layer 150. Here, FIG. 2B is illustrated schematically. The electrical field E is then removed to complete the fabrication of the LCD panel 100.

In the first substrate 110 of the present embodiment, each of the pixel electrodes 118 and the auxiliary electrode 120 disposed above each of the pixel electrodes 118 belong to different film layers and are disposed on different planes. Thus, when the pixel electrode 118 is applied with the second curing voltage Vcur2, a fringe field effect (FFE) would be generated at the edge of the auxiliary electrode 120. Moreover, the shielding electrode 122 surrounding the auxiliary electrode 120 would also generate the FFE at the edge of the pixel electrode 118. Therefore, the electrical field E is not evenly distributed in each of the pixel areas P Under the FFE provided by the auxiliary electrode 120 and the shielding electrode 122, the LC molecules 152 are aligned in a specific arrangement, such as the condition shown in FIG. 2B. In other words, under the structural design of the first substrate 100, when the second curing voltage Vcur2 transmits to the pixel electrode 118, the LC molecules 152 at different locations would be arranged at different pre-tilt angles. At this time, the alignment manner of the LC molecule 152 affects the polymerization process of the monomer material 154. Thus, the alignment manner of the polymers in the first PSA layer 162 and the second PSA layer 164 has specific structural characteristics. In the present invention, the second curing voltage Vcur2 is directly applied to the pixel electrode 118, where the second curing voltage Vcur2 provides a more stable and more accurate liquid crystal alignment effect than the curing voltage of a common electrode coupled to the pixel electrode 118.

After the electrical field E is removed, the specific structural characteristics of the first PSA layer 162 and the second PSA layer 164 provide a certain alignment anchor force and conduce in enhancement of a response rate of the LC molecules 152. In other words, the present embodiment does not require the design of fine slits or fine protrusions for performing the PSA manufacturing process to form the MVA-LCD panel 100, and a relatively stable alignment effect can still be achieved. Therefore, in the LCD panel 100 produced by the manufacturing process described above, the LC molecules 152 have an efficient response rate. Moreover, the display quality of the LCD panel 100 is not affected by the fine slits or the alignment protrusions, and is further elevated.

In the present embodiment, the pixel electrode 118 is entirely disposed in the pixel area P. Hence, the LC molecules in the entire pixel area P would proceed to display when the LCD panel 100 displays an image. In comparison with the conventional design in which the LC molecules above the fine slits cannot proceed to display, the LCD panel 100 has favorable display brightness. In addition, in order for the LCD panel 100 to accomplish a multi-color display effect, the first substrate 110 or the second substrate 130 further includes a plurality of color filter units, each located in the corresponding pixel area P. That is, the second substrate 130 can be a color filter substrate, or the first substrate 110 can have a design of a color filter on array (COA) or an array on color filter (AOC).

Notably, the manufacturing method of the present embodiment is not limited to the application of the LCD panel 100 as shown in FIG. 1. In other embodiments of the present invention, the above-mentioned manufacturing method can also be applied to LCD panels that do not include the auxiliary electrodes 120 and the shielding electrodes 122. Besides, in the sequence of stacking metal films in the LCD panel 100 as shown in FIG. 2B, the data line 114 is manufactured by the first metal layer directly disposed on the substrate while the scan line 112 is manufactured by the second metal layer disposed on an insulating layer. Meanwhile, the auxiliary electrode 120 and the shielding electrode 122 are manufactured by the third metal layer. Nevertheless, the present invention should not be construed as limited to the embodiments set forth herein. In another embodiment of the present invention, the data line 114 and the scan line 112 can also be manufactured respectively by the second metal layer and the first metal layer.

Figure 3A:
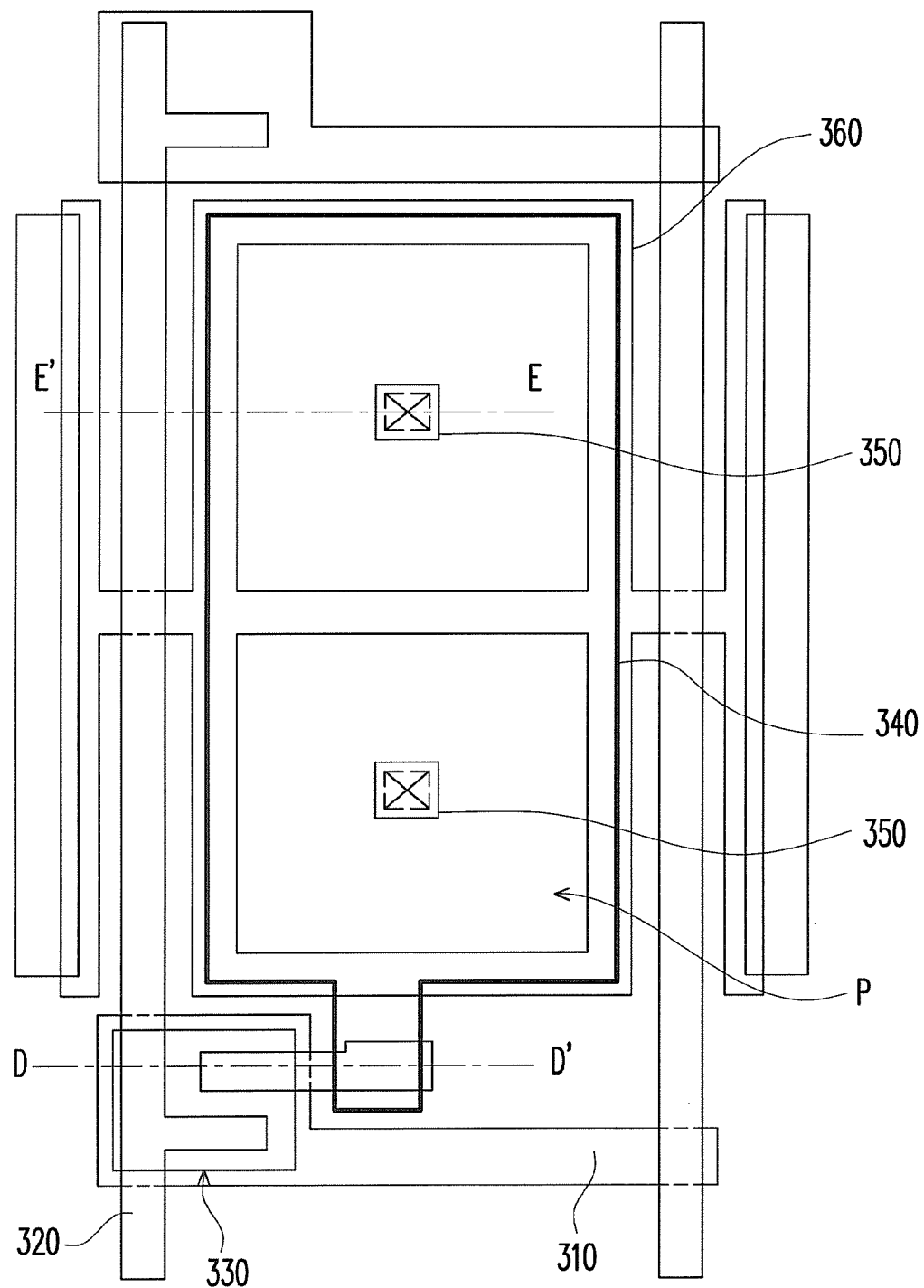
FIGS. 3A and 3B respectively show a schematic top view and a schematic cross-sectional view of the first substrate of the LCD panel in another embodiment of the present invention.
Figure 3B:
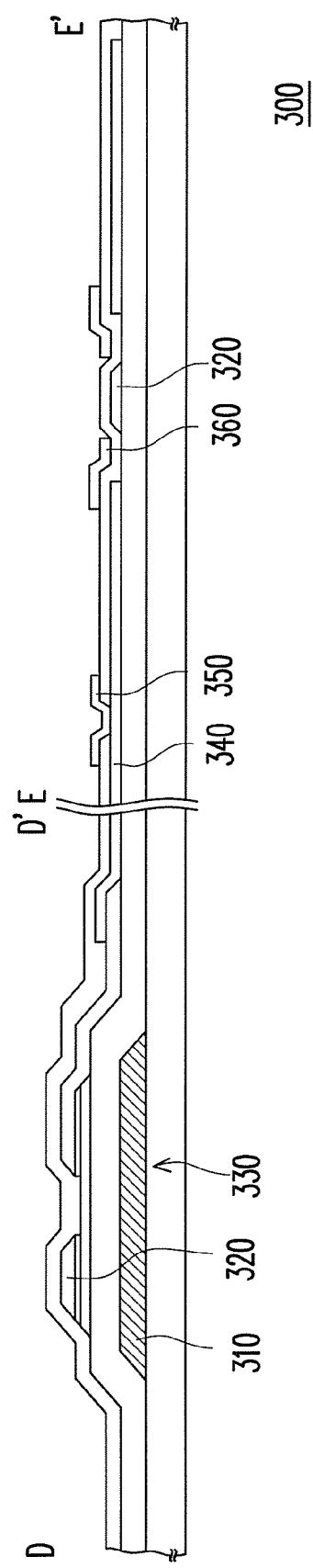

FIGS. 3A and 3B respectively show a schematic top view and a schematic cross-sectional view of the first substrate of the LCD panel in another embodiment of the present invention. Here, FIG. 3B shows cross-sectional lines D-D', and E-E' depicted in FIG. 3A. Referring to FIGS. 3A and 3B, a first substrate 300 has a plurality of scan lines 310 and a plurality of data lines 320. Here, as an example, FIG. 3A shows two lines each. The scan lines 310 intersect with the data lines 320 respectively and define a plurality of pixel areas P on the first substrate 300. The first substrate 300 in each of the pixel areas P further includes an active device 330, a pixel electrode 340, two auxiliary electrodes 350, and a shielding electrode 360. The electrical connection relationship between the aforesaid devices is identical to the electrical connection relationship between the devices in the first substrate 110 described in the previous embodiment of the present invention. Moreover, the two auxiliary electrodes 350 are surrounded by the shielding electrode 360.

In the first substrate 300, the application of the two auxiliary electrodes 350 in an LCD panel allows the LC molecules in the LCD panel to be aligned in more multiple domains. In other words, the design of the first substrate 300 further enhances the wide viewing angle display effect of the LCD panel. Furthermore, because the two auxiliary electrodes 350 are disposed in the present embodiment, the shielding electrode 360 of the present invention is presented as the configuration of "θ".

Specifically, the cross-sectional view of FIG. 3B shows that the scan line 310 in the present embodiment is manufactured by the first metal layer, the data line 320 is manufactured by the second metal layer, and the auxiliary electrode 350 and the shielding electrode 360 are both manufactured by the third metal layer. In other words, the manufacturing sequence of the first substrate 300 is different from the manufacturing sequence of the first substrate 110.

Additionally, in the first substrate 300, the auxiliary electrode 350 and the pixel electrode 340 belong to different films and are disposed on different planes. Therefore, when a voltage is applied to the pixel electrode 340, the FFE is generated between the auxiliary electrode 350 and the pixel electrode 340. Similarly, a corresponding FFE is generated between the shielding electrode 360 and the pixel electrode 340. Thus, when the first substrate 300 applies the manufacturing method of the LCD panel described in the previous embodiment, the LC layer of the LCD panel can have the multi-domain alignment. In other words, the application of the first substrate 300 in the above-mentioned manufacturing method gives rise to the increase in the response rate of the LC molecules in the LCD panel and the elevation in display quality of the LCD panel.

In light of the foregoing, different curing voltages are applied respectively to the scan lines and the data lines for directly supplying the curing voltages to the pixel electrode according to the present invention. Thereby, the PSA manufacturing process can be performed on the LCD panel without the dispositions of the fine slits and the alignment protrusions. As such, the LCD panel of the present invention has good display brightness, and the response rate of the LC molecules in the LCD panel remains satisfactory. In general, the manufacturing method of the LCD panel of the present invention improves the quality of the LCD panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A manufacturing method of a liquid crystal display (LCD) panel, comprising:
providing a panel, the panel including a first substrate, a second substrate and a liquid crystal (LC) layer, wherein the first substrate has a plurality of scan lines and a plurality of data lines, and the scan lines and the data lines are intersected respectively and define a plurality of pixel areas on the first substrate, the first substrate in each of the pixel areas comprising an active device, a pixel electrode, an auxiliary electrode, and a shielding electrode, the active device being coupled to the corresponding scan line and data line, the pixel electrode being coupled to the active device, the auxiliary electrode being disposed on and coupled to the pixel electrode, the shielding electrode being disposed at peripheries of the pixel electrode and surrounding the auxiliary electrode, the second substrate comprising an opposite electrode, the liquid crystal layer being disposed between the first substrate and the second substrate, the liquid crystal layer comprising a plurality of liquid crystal molecules and a monomer material;

applying a first curing voltage to the scan lines, and applying a second curing voltage to the data lines, wherein the first curing voltage is higher than an absolute value of the second curing voltage and a voltage difference between the first curing voltage and the second curing voltage is greater than a threshold voltage of the active devices to allow the second curing voltage to be transmitted to the pixel electrodes, and an electrical field is generated in the liquid crystal layer to arrange the liquid crystal molecules at a pre-tilt angle;

polymerizing the monomer material in the liquid crystal layer to form a first polymer stabilized alignment (PSA) layer between the first substrate and the liquid crystal layer and to form a second polymer stabilized alignment layer between the second substrate and the liquid crystal layer; and removing the electrical field.

2. The manufacturing method of the liquid crystal display panel according to claim 1, wherein a method of polymerizing the monomer material in the liquid crystal layer comprises irradiating the monomer material with a light.

3. The manufacturing method of the liquid crystal display panel according to claim 2, wherein a power of the light irradiating the monomer material is from 50 mW to 1000 mW.

4. The manufacturing method of the liquid crystal display panel according to claim 2, wherein a time that the light irradiates the monomer material is from 50 seconds to 500 seconds.

5. The manufacturing method of the liquid crystal display panel according to claim 1, wherein when the electrical field is generated in the liquid crystal layer, a voltage difference between the pixel electrodes and the opposite electrode is from 5V to 40V.

6. The manufacturing method of the liquid crystal display panel according to claim 1, wherein a voltage difference between the first curing voltage and the second curing voltage is greater than 7V.

7. The manufacturing method of the liquid crystal display panel according to claim 1, wherein a potential of the opposite electrode and the shielding electrode comprises a grounded potential.

8. A liquid crystal display (LCD) panel, comprising:
a first substrate, comprising a plurality of scan lines and a plurality of data lines, the scan lines intersecting with the data lines respectively, a plurality of pixel areas being defined on the first substrate, the first substrate in each of the pixel areas further comprising an active device, a pixel electrode, an auxiliary electrode, and a shielding electrode, wherein the active device is coupled to the corresponding scan line and data line, the pixel electrode is coupled to the active device, the auxiliary electrode is disposed on and coupled to the pixel electrode, and the shielding electrode is disposed at peripheries of the pixel electrode and surrounds the auxiliary electrode;
a second substrate, having an opposite electrode;

a liquid crystal (LC) layer, disposed between the first substrate and the second substrate, the liquid crystal layer comprising a plurality of liquid crystal molecules;

a first polymer stabilized alignment (PSA) layer, disposed between the first substrate and the liquid crystal layer; and a second polymer stabilized alignment layer, disposed between the second substrate and the liquid crystal layer, wherein the first polymer stabilized alignment layer and the second polymer stabilized alignment layer are formed when an electrical field is generated in the liquid crystal layer to arrange the liquid crystal molecules at a pre-tilt angle and the electrical field is generated by applying a first curing voltage to the scan lines, and applying a second curing voltage to the data lines, while the first curing voltage is higher than an absolute value of the second curing voltage and a voltage difference between the first curing voltage and the second curing voltage is greater than a threshold voltage of the active devices to allow the second curing voltage to be transmitted to the pixel electrodes.

9. The liquid crystal display panel according to claim 8, wherein the first polymer stabilized alignment layer and the second polymer stabilized alignment layer are polymerized by a monomer material doped in the liquid crystal layer.

10. The liquid crystal display panel according to claim 9, wherein the monomer material comprises a light reactive monomer material.

11. The liquid crystal display panel according to claim 10, wherein the monomer material is polymerized to form the first polymer stabilized alignment layer and the second polymer stabilized alignment layer by irradiating the monomer material with a light, and a power of the light irradiating the monomer material is from 50 mW to 1000 mW.

12. The liquid crystal display panel according to claim 11, wherein a time that the light irradiates the monomer material is from 50 seconds to 500 seconds.

13. The liquid crystal display panel according to claim 11, wherein an electrical field is further applied to the liquid crystal layer through the opposite electrode and the pixel electrodes before the irradiation, and the liquid crystal molecules are arranged at a pre-tilt angle.

14. The liquid crystal display panel according to claim 13, wherein when the electrical field is applied to the liquid crystal layer, a voltage difference between the pixel electrodes and the opposite electrode is from 5V to 40V.

15. The liquid crystal display panel according to claim 13, wherein when the electrical field is applied to the liquid crystal molecules, a voltage applied to the scan lines is higher than an absolute value of the voltage applied to the data lines, and a voltage difference between the scan lines and the data lines is greater than a threshold voltage of the active devices.

16. The liquid crystal display panel according to claim 13, wherein when the electrical field is applied to the liquid crystal molecules, a voltage difference between the scan lines and the data lines is greater than 7V.

17. The liquid crystal display panel according to claim 8, wherein the first substrate further comprises a plurality of color filter units respectively located in the pixel areas.

18. The liquid crystal display panel according to claim 8, wherein the second substrate further comprises a plurality of color filter units respectively corresponding to the pixel areas.

19. A manufacturing method of a liquid crystal display (LCD) panel, comprising:

providing a panel, the panel comprising a first substrate, a second substrate and a liquid crystal layer, wherein the first substrate has a scan line and a data line, and the scan lines intersect with the data lines respectively, the first substrate further comprising an active device and a pixel electrode, the active device being coupled to the scan line and the data line, the pixel electrode being coupled to the active device, the second substrate having an opposite electrode, the liquid crystal layer being located between the first substrate and the second substrate, the liquid crystal layer including a plurality of liquid crystal molecules and a monomer material;

applying a first curing voltage to the scan lines, and applying a second curing voltage to the data lines, wherein the first curing voltage is higher than an absolute value of the second curing voltage and a voltage difference between the first curing voltage and the second curing voltage is greater than a threshold voltage of the active devices to allow the second curing voltage to be transmitted to the pixel electrode, and an electrical field is generated in the liquid crystal layer to arrange the liquid crystal molecules at a pre-tilt angle;

polymerizing the monomer material in the liquid crystal layer to form a first polymer stabilized alignment (PSA) layer between the first substrate and the liquid crystal layer and to form a second polymer stabilized alignment layer between the second substrate and the liquid crystal layer; and removing the electrical field.

20. A manufacturing method of a liquid crystal display (LCD) panel, comprising:

providing a panel, the panel comprising a first substrate, a second substrate and a liquid crystal layer, wherein the first substrate has a scan line and a data line, and the scan lines intersect with the data lines respectively, the first substrate further comprising an active device and a pixel electrode, the active device being coupled to the scan line and the data line, the pixel electrode being coupled to the active device, the second substrate having an opposite electrode, the liquid crystal layer being located between the first substrate and the second substrate, the liquid crystal layer including a plurality of liquid crystal molecules and a monomer material;

applying a first curing voltage to the scan lines, and applying a second curing voltage to the data lines, wherein the first curing voltage is higher than an absolute value of the second curing voltage to allow the second curing voltage to be transmitted to the pixel electrode, and an electrical field is generated in the liquid crystal layer to arrange the liquid crystal molecules at a pre-tilt angle;

polymerizing the monomer material in the liquid crystal layer to form a first polymer stabilized alignment (PSA) layer between the first substrate and the liquid crystal layer and to form a second polymer stabilized alignment layer between the second substrate and the liquid crystal layer by irradiating the monomer material with a light, wherein a power of the light irradiating the monomer material is from 50 mW to 1000 mW; and removing the electrical field.

21. A manufacturing method of a liquid crystal display (LCD) panel, comprising:

providing a panel, the panel comprising a first substrate, a second substrate and a liquid crystal layer, wherein the first substrate has a scan line and a data line, and the scan lines intersect with the data lines respectively, the first substrate further comprising an active device and a pixel electrode, the active device being coupled to the scan line and the data line, the pixel electrode being coupled to the active device, the second substrate having an opposite electrode, the liquid crystal layer being located between the first substrate and the second substrate, the liquid crystal layer including a plurality of liquid crystal molecules and a monomer material;

applying a first curing voltage to the scan lines, and applying a second curing voltage to the data lines, wherein the first curing voltage is higher than an absolute value of the second curing voltage to allow the second curing voltage to be transmitted to the pixel electrode, and an electrical field is generated in the liquid crystal layer to arrange the liquid crystal molecules at a pre-tilt angle;

polymerizing the monomer material in the liquid crystal layer to form a first polymer stabilized alignment (PSA) layer between the first substrate and the liquid crystal layer and to form a second polymer stabilized alignment layer between the second substrate and the liquid crystal layer by irradiating the monomer material with a light, wherein a time that the light irradiates the monomer material is from 50 seconds to 500 seconds; and removing the electrical field.

* * * * *